(12) United States Patent
Ooga et al.

(10) Patent No.: US 8,442,685 B2
(45) Date of Patent: May 14, 2013

(54) ROBOT CONTROL APPARATUS

(75) Inventors: Junichiro Ooga, Kanagawa-ken (JP); Junji Oaki, Kanagawa-ken (JP); Hideki Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 13/050,069

(22) Filed: Mar. 17, 2011

(65) Prior Publication Data

US 2012/0022690 A1 Jan. 26, 2012

(30) Foreign Application Priority Data

Jul. 22, 2010 (JP) ................................. 2010-165188

(51) Int. Cl.
| | |
|---|---|
| B25J 9/18 | (2006.01) |
| G05B 19/19 | (2006.01) |
| G05B 19/04 | (2006.01) |
| G05B 19/408 | (2006.01) |
| G05B 15/00 | (2006.01) |
| G05B 19/00 | (2006.01) |
| G05B 19/18 | (2006.01) |

(52) U.S. Cl.
USPC ........... 700/261; 700/249; 700/251; 700/254; 901/34; 318/568.11; 318/568.2; 318/568.22

(58) Field of Classification Search .. 318/568.1–568.25; 700/245–264; 901/15, 16, 18, 30, 34, 45, 901/49; 73/9
See application file for complete search history.

(56) References Cited

U.S. PATENT DOCUMENTS

2003/0135303 A1* 7/2003 Arai et al. ..................... 700/245
2011/0060460 A1 3/2011 Oga et al.

FOREIGN PATENT DOCUMENTS

JP 2006-020487 1/2006
WO WO 2010/050119 A1 * 5/2010

OTHER PUBLICATIONS

Ryogo Kubo and Kouhei Ohnishi, Attitude Control of Planar End-Effector and Estimation of Contact Point Using Parallel Mechanism, Electronics anc Communications in Japan, vol. 91 No. 3, 2008. pp. 28-36.*

* cited by examiner

*Primary Examiner* — Khoi Tran
*Assistant Examiner* — Abby Lin
(74) *Attorney, Agent, or Firm* — Turocy & Watson, LLP

(57) ABSTRACT

In an embodiment of the present invention, with the purpose of more accurately calculating a disturbance torque generated by an external force acting on a robot, friction parameters contained in algorithms, such as a friction coefficient and a dead-zone threshold value, are dynamically changed based on the mode of operation, the operation speed, and the like. In this manner, a drive torque is estimated with high accuracy.

6 Claims, 6 Drawing Sheets

ROBOT CONTROL APPARATUS

CROSS-REFERENCE TO RELATED APPLICATION

This application is based upon and claims the benefit of priority from prior Japanese Patent Application No. 2010-165188 filed on Jul. 22, 2010 in Japan, the entire contents of which are incorporated herein by reference.

FIELD

Embodiments described herein relate to a robot control apparatus that drives a robot using an actuator such as a motor.

BACKGROUND

In a so-called force control operation, the position of the tip end (such as the end position of an arm) of a robot in the task coordinate system and the contact force of the tip end are controlled while the tip end is in contact with an object. In such a force control operation, it is essential to estimate the external force acting on the tip end, and flexibly perform an operation correction in accordance with the estimated external force. In a case where a force sensor is attached to the tip end, the external force can be measured with high accuracy. However, a force sensor is expensive and is easily damaged by shocks. Therefore, the use of a force sensor is often avoided. Where no force sensors are used, it is necessary to estimate an actuator disturbance torque generated by the external force acting on the robot. The disturbance torque is calculated by subtracting the estimated drive torque necessary for movement of the actuator from an actually drive torque command value. Therefore, it is necessary to identify, with high accuracy, the parameters of the dynamic model to be used for the calculation.

Particularly, it is known that a friction varies in a complicated manner due to short-term factors such as the actuator speed, the operating direction, the operating history, and the variations of loads attached to the tip end, as well as long-term factors such as temperature variations over different seasons and different times of the day and age-related degradation depending on the state of use. Since the parameters contained in a friction approximation model vary due to the above-mentioned factors, it is necessary to identify appropriate parameters in real time. There has been a known technique of identifying a coulomb friction coefficient, a viscous friction coefficient, and a constant disturbance torque in real time.

According to the technique of identifying a coulomb friction coefficient, a viscous friction coefficient, and a constant disturbance torque in real time, the viscous friction is approximated by a broken line. However, it is a known fact that a friction torque gradually becomes saturated as the drive speed becomes higher. To perform high-accuracy approximation at various speeds in a wider range, approximation models such as an arc tangent or a linear sum of exponential functions have been suggested. With those models, it is also necessary to identify parameters in real time.

DETAILED DESCRIPTION

Figure 1:
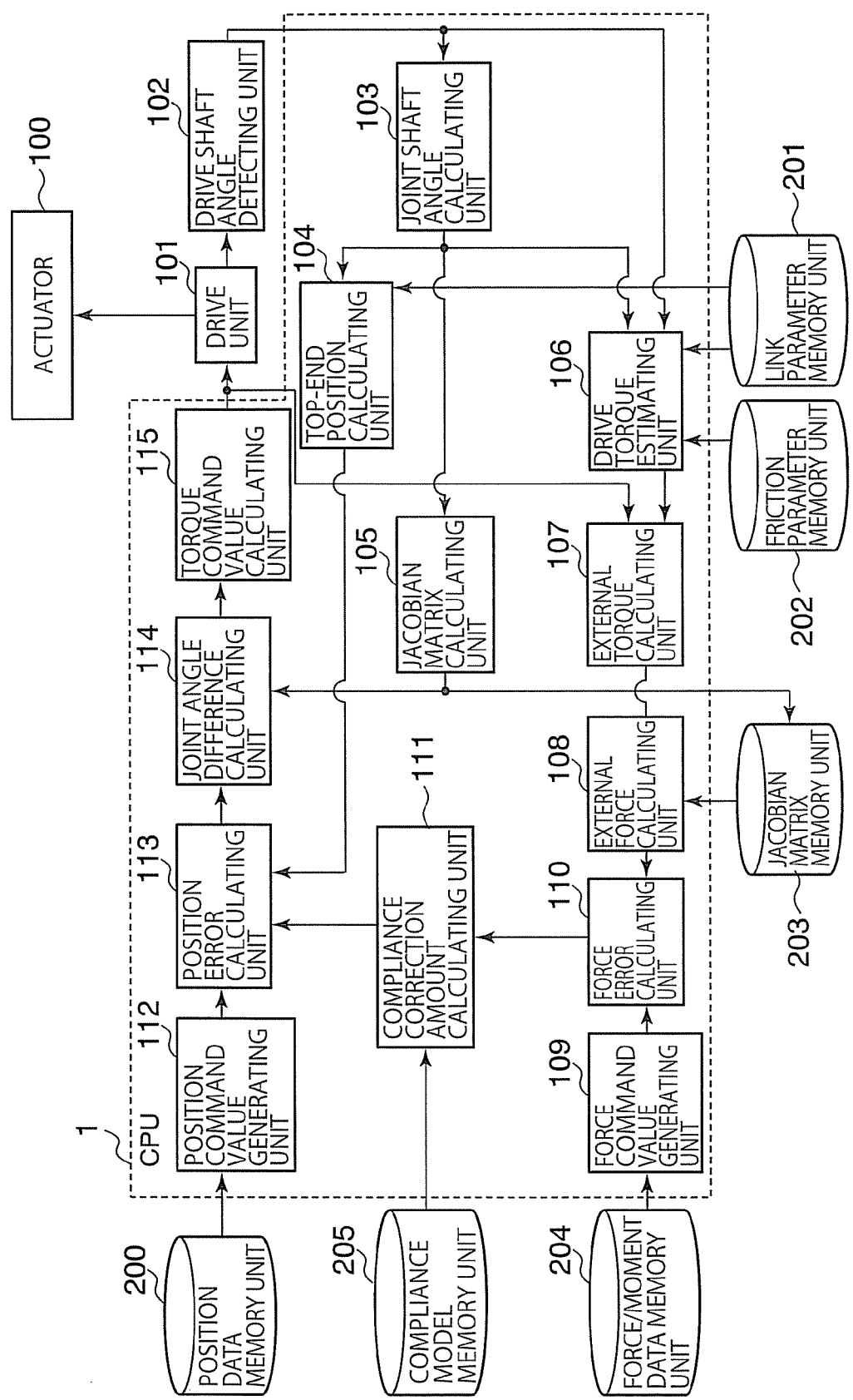
FIG. 1 is a control block diagram of a robot control apparatus according to an embodiment of the present invention.

Hereinafter, an embodiment of the present invention will be described with reference to the drawings. In the drawings, like components are denoted by like reference numerals. However, the drawings are merely schematic, and specific sizes should be determined in conjunction with the following description. Also, of course, some of the relative sizes and proportions vary among the drawings.

According to an embodiment, there is provided a robot control apparatus that controls a robot including a joint shaft and a drive shaft transmitting a drive force to the joint shaft. The robot control apparatus includes: an actuator configured to drive the joint shaft in each control cycle; a drive shaft angle detecting unit configured to detect an angle of the drive shaft; a joint shaft angle calculating unit configured to calculate an angle of the joint shaft from the angle of the drive shaft; a tip-end position calculating unit configured to calculate a position of a tip end of the robot from the angle of the joint shaft; a position error calculating unit configured to calculate a position error between the tip-end position and a position command value of the tip-end position; a Jacobian matrix calculating unit configured to calculate a Jacobian matrix between a task coordinate system and a joint coordinate system at the tip-end position, based on the angle of the joint shaft; a joint angle difference calculating unit configured to calculate a joint angle difference; a torque command value calculating unit configured to calculate a torque command value of a joint, based on the joint angle difference; a drive unit configured to drive the actuator, based on the torque command value; a drive torque estimating unit configured to estimate a drive torque for driving the actuator from the angle of the joint shaft; an external torque calculating unit configured to calculate an external torque that is a difference between the drive torque estimated and the torque command value; an external force calculating unit configured to calculate an external force acting on the tip-end position, from the external torque and the Jacobian matrix; a compliance model memory unit configured to store a compliance model at the tip-end position; a compliance correction amount calculating unit configured to calculate a compliance correction amount for the tip-end position in a task coordinate system in accordance with the external force, using the compliance model, the compliance correction amount calculating unit correcting the position error with the use of the compliance correction amount; a friction parameter memory unit configured to store friction parameters including at least one parameter of a model approximating a friction torque; and a friction torque evaluating unit. The drive torque estimating unit includes: a drive shaft speed calculating unit configured to calculate a speed of the drive shaft from the angle of the drive shaft; an inertia torque calculating unit configured to calculate an inertia torque acting on the joint shaft; a gravity torque calculating unit configured to calculate a gravity torque acting on the joint shaft; a first friction torque calculating unit configured to estimate a first friction torque, using the calculated speed of the drive shaft and the friction parameters stored in the friction parameter memory unit; and a second friction torque calculating unit configured to calculate a plurality of second friction torques by varying the friction parameters. The friction torque evaluating unit calculates a sum of a calculated first friction torque, a second friction torque selected from the plurality of second friction torques, the calculated inertia torque, and the calculated gravity torque. The friction torque evaluating unit calculates a torque error between the sum and the torque command value calculated by the torque command value calculating unit. The torque error is calculated for each of the second friction torques. The friction torque evaluating unit selects a friction parameter based on the torque error, and the friction parameters are updated based on a result of the selection.

As shown in FIG. 1, the robot control apparatus according to an embodiment includes a central processing unit (CPU) 1, an actuator 100, a drive unit (an amplifier) 101, a drive shaft angle detecting unit 102, a position data memory unit 200, a link parameter memory unit 201, a friction parameter memory unit 202, a Jacobian matrix memory unit 203, a force/moment data memory unit 204, and a compliance model memory unit 205.

A position sensor such as an encoder can be used as the drive shaft angle detecting unit 102, and the drive shaft angle detecting unit 102 may include a filter that removes predetermined frequency components. The drive shaft angle detecting unit 102 detects the displacement of the position of the drive shaft (the angle of the drive shaft).

The CPU 1 shown in FIG. 1 logically includes, as modules (logic circuits) that are hardware resources, a joint shaft angle calculating unit 103, a tip-end position calculating unit 104, a Jacobian matrix calculating unit 105, a drive torque estimating unit 106, an external torque calculating unit 107, an external force calculating unit 108, a force command value generating unit 109, a force error calculating unit 110, a compliance correction amount calculating unit 111, a position command value generating unit 112, a position error calculating unit 113, a joint angle difference calculating unit 114, and a torque command value calculating unit 115.

Based on the drive shaft angle calculated by the drive shaft angle detecting unit 102, the joint shaft angle calculating unit 103 calculates a joint shaft angle in accordance with the speed reduction ratio of a speed reducer, and the ratio between the drive shaft and the joint shaft of the driver. The joint shaft angle may be determined directly by a joint shaft angle detecting unit (not shown) attached to the joint shaft.

The tip-end position calculating unit 104 reads link parameters from the link parameter memory unit 201, and calculates the position of the tip end, or the tip-end position, of the task coordinate system of the robot through a forward kinematic calculation using the joint shaft angle calculated by the joint shaft angle calculating unit 103 and the read link parameters.

The Jacobian matrix calculating unit 105 calculates a Jacobian matrix from the joint shaft angle calculated by the joint shaft angle calculating unit 103, and stores the calculated Jacobian matrix into the Jacobian matrix memory unit 203. A Jacobian matrix is a matrix representing the minute displacement relation between the task coordinate system and the joint coordinate system of the robot. Where J represents a Jacobian matrix, the error $\Delta x$ in the tip-end position of the robot and the joint angle difference $\Delta \theta$ satisfy the relationship expressed by the following equation (1):

$$\Delta x = J \Delta \theta \qquad (1)$$

Figure 2:
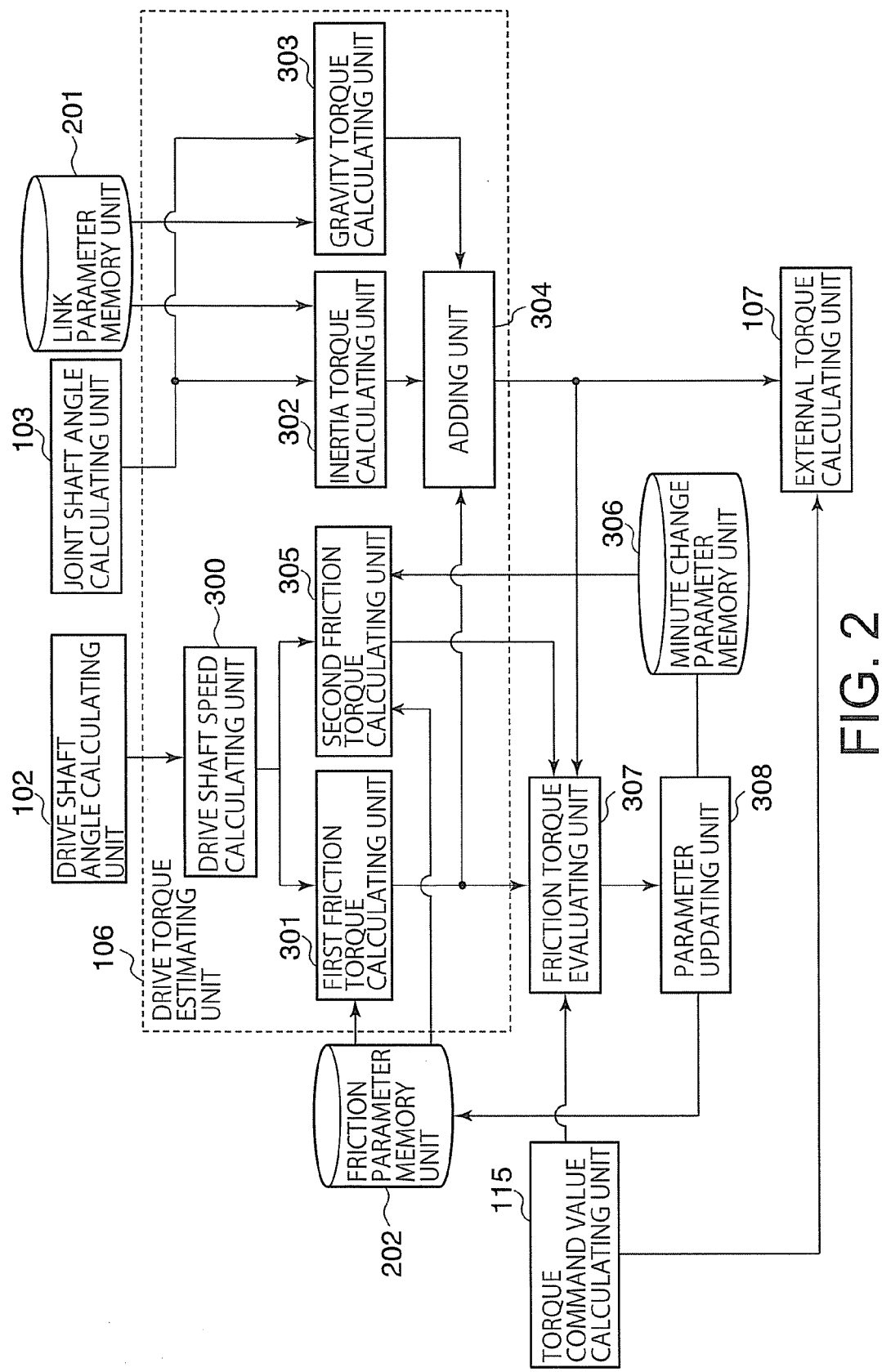
FIG. 2 is a control block diagram showing a specific example of a drive torque estimating unit according to the embodiment.

The drive torque estimating unit 106 estimates the drive torque required for driving the joint shaft of the robot, using the drive shaft angle detected by the drive shaft angle detecting unit 102 and the joint shaft angle calculated by the joint shaft angle calculating unit 103. FIG. 2 shows a specific example of the drive torque estimating unit 106. As shown in FIG. 2, the drive torque estimating unit 106 of the specific example includes a drive shaft speed calculating unit 300, a first friction torque calculating unit 301, an inertia torque calculating unit 302, a gravity torque calculating unit 303, an adding unit 304, and a second friction torque calculating unit 305.

As shown in FIG. 2, the drive shaft speed calculating unit 300 calculates a drive shaft speed by calculating a difference in the drive shaft angle at predetermined time intervals, for example, based on the drive shaft angle calculated by the drive shaft angle calculating unit 102. The first friction torque calculating unit 301 reads the friction parameters stored in the friction parameter memory unit 202, and calculates a first friction torque corresponding to a coulomb friction, a viscous friction, or the like, using the read friction parameters and the drive shaft speed calculated by the drive shaft speed calculating unit 300.

The second friction torque calculating unit 305 will now be described. Sets of friction parameters are prepared from the friction parameters stored in the friction parameter memory unit 202 and minute change values stored in a minute change parameter memory unit 306. For example, where a friction torque $\tau_f$ is defined by the function expressed by the following equation (2) with respect to a drive shaft speed $\omega(=d\theta/dt)$, the friction parameters are combinations (A, B, C) of the three kinds of parameters A, B, and C. The equation (2) is:

$$\tau_f = A \times \arctan(B \times \omega) + C \qquad (2)$$

Figure 3:
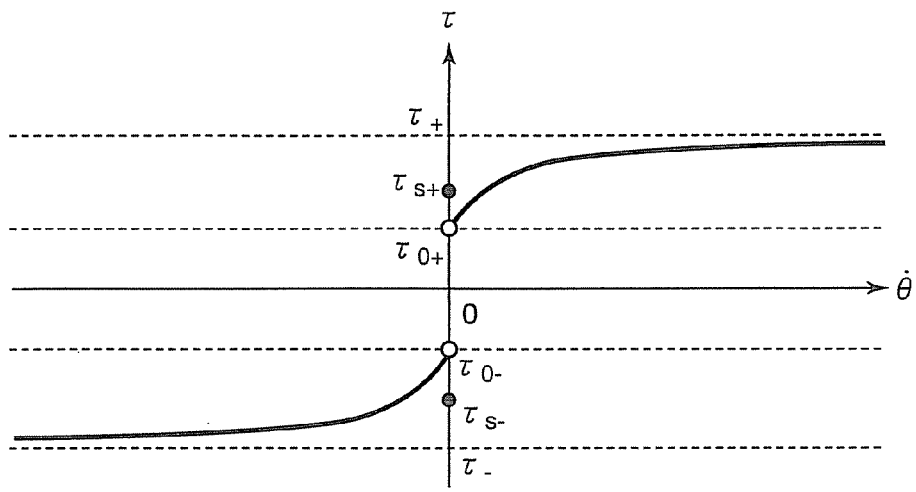
FIG. 3 is a graph showing the relationship between a friction torque $\tau_f$ and a drive shaft speed $\omega$.
Figure 4:
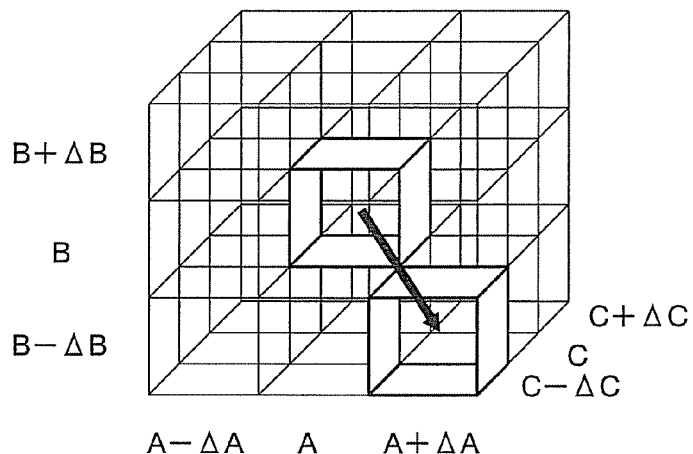
FIG. 4 is a diagram for explaining sets of friction parameters.

The function expressed by the equation (2) can also be expressed by the graph shown in FIG. 3. As for the respective parameters, $A+\Delta A$, $A-\Delta A$, $B+\Delta B$, $B-\Delta B$, $C+\Delta C$, and $C-\Delta C$ are calculated from the minute changes $\Delta A$, $\Delta B$, and $\Delta C$, and second friction torques are calculated for the respective sets of friction parameters formed by combining $A+\Delta A$, $A-\Delta A$, $B+\Delta B$, $B-\Delta B$, $C+\Delta C$, and $C-\Delta C$. In this case, the number of sets of friction parameters is twenty-seven, inclusive of the parameters having no minute changes, as can be seen from FIG. 4. Among the twenty-seven sets of friction parameters, the friction torque with respect to the friction parameters (A, B, and C) in which the parameters A, B, and C do not change at all is calculated by the first friction torque calculating unit 301. As for the remaining twenty-six sets of friction parameters, the second friction torques are calculated by the second friction torque calculating unit 305 using the equation (2), for example. Therefore, there are twenty-six second friction torque values.

The inertia torque calculating unit 302 calculates a joint angular acceleration, using the joint shaft angle calculated by the joint shaft angle calculating unit 103. The inertia torque calculating unit 302 reads the link parameters from the link parameter memory unit 201, and calculates the inertia moment of each link, using the read link parameters and the joint shaft angle calculated by the joint shaft angle calculating unit 103. The inertia torque calculating unit 302 then calculates an inertia torque, using the calculated joint angular acceleration and the calculated inertia moment.

The gravity torque calculating unit 303 reads the link parameters from the link parameter memory unit 201, and calculates the gravity acting on each link, using the read link parameters and the joint shaft angle calculated by the joint shaft angle calculating unit 103. The gravity torque calculating unit 303 then calculates the gravity torque compensating for the calculated gravity.

The adding unit 304 adds the first friction torque calculated by the first friction torque calculating unit 301, the inertia torque calculated by the inertia torque calculating unit 302, and the gravity torque calculated by the gravity torque calculating unit 303. The adding unit 304 outputs the resultant sum as an estimated drive torque.

The difference between the drive torque estimated by the drive torque estimating unit 106 in the above manner and a torque command value calculated by the torque command value calculating unit 115 is calculated as an external torque by the external torque calculating unit 107 shown in FIG. 1.

The friction torque evaluating unit 307 adds the calculated first friction torque, a second friction torque selected from the twenty-six second friction torques, the calculated inertia torque, and the calculated gravity torque. The friction torque evaluating unit 307 then calculates the difference between the total sum of those values and the torque command value. The friction torque evaluating unit 307 performs this difference calculation for each of the twenty-six second friction torques. The friction torque evaluating unit 307 selects and votes for the friction parameter having the smallest absolute value of the difference among the set of friction parameters.

The parameter updating unit 308 calculates the results of the voting performed by the friction torque evaluating unit 307 in a friction parameter estimating interval. The parameter updating unit 308 then stores the friction parameters that have gained the largest number of votes in a predetermined updating cycle into the friction parameter memory unit 202. In this manner, the parameter updating unit 308 updates the friction parameters.

The external force calculating unit 108 shown in FIG. 1 calculates an external force, using the external torque calculated by the external torque calculating unit 107 and the Jacobian matrix calculated by the Jacobian matrix calculating unit 105. Based on the principle of virtual work, the external force $f_d$ is calculated by multiplying the external torque $\tau_d$ by the inverse matrix of the transposed matrix $J^T$ of the Jacobian matrix J, as indicated by the following equation (3):

$$f_d = (J^T)^{-1} \tau_d \tag{3}$$

The force command value generating unit 109 shown in FIG. 1 reads the force/moment data stored in the force/moment data memory unit 204, and outputs the force/moment command value of each control cycle.

The force error calculating unit 110 calculates a force error $\Delta f$, based on the force/moment command value calculated by the force command value generating unit 109 and the external force calculated by the external force calculating unit 108.

The compliance correction amount calculating unit 111 reads a compliance model from the compliance model memory unit 205, and calculates a position correction amount corresponding to the output $\Delta f$ of the force error calculating unit 110, using the read compliance model. Here, the compliance model virtually sets inertia, viscosity, and rigidity with respect to the object of contact, as indicated by the following equation (4), for example.

$$M d^2 \Delta x / dt^2 + D d \Delta x / dt + K \Delta x = K_f \Delta f \tag{4}$$

where $\Delta x$ represents an error in the task coordinate system set at the tip end, $d\Delta x/dt$ represents a speed in the task coordinate system, $d^2\Delta x/dt^2$ represents an acceleration vector in the task coordinate system, M represents am inertia matrix, D represents a viscosity coefficient matrix, K represents a rigidity coefficient matrix, and $K_f$ represents a force feedback gain matrix. A compliance select matrix that switches force and position acting axes is included in the force feedback gain matrix $K_f$. The error speed $d\Delta x/dt$ and the acceleration vector $d^2\Delta x/dt^2$ can be approximated by a first difference and a second difference of the position error vector $\Delta x$ with respect to time, respectively. Accordingly, the compliance correction amount $\Delta x_{comp}$ can be calculated according to the following equation (5):

$$\Delta x_{comp} = 1/K (K_f \Delta f - M d^2 \Delta x / dt^2 - D d \Delta x / dt) \tag{5}$$

The position command value generating unit 112 reads a target tip-end position data stored in the position data memory unit 200, and calculates the interpolated tip-end position command value of each control cycle, based on the target tip-end position data.

Based on the tip-end position command value $x_R$ generated by the position command value generating unit 112, the current tip-end position x calculated by the tip-end position calculating unit 104, and the compliance correction amount $\Delta x_{comp}$ calculated by the compliance correction amount calculating unit 111, the position error calculating unit 113 calculates the position error $\Delta x$ with the use of the following equation (6):

$$\Delta x = x_R - x + \Delta x_{comp} \tag{6}$$

Using the position error $\Delta x$ calculated by the position error calculating unit 113 and the inverse matrix $J^{-1}$ of the Jacobian matrix J, the joint angle difference calculating unit 114 calculates a joint angle difference $\Delta f$ according to the following equation (7):

$$\Delta \theta = J^{-1} \Delta x \tag{7}$$

The torque command value calculating unit 115 generates the torque command value (the control target value) by integrating the joint angle difference calculated by the joint angle difference calculating unit 114.

Based on the torque command value calculated by the torque command value calculating unit 115, the drive unit 101 drives the actuator 100 in each control cycle.

Semiconductor memories, magnetic disks, optical disks, magnetooptical disks, magnetic tapes, and the like may be used as the position data memory unit 200, the link parameter memory unit 201, the friction parameter memory unit 202, the Jacobian matrix memory unit 203, the force/moment data memory unit 204, and the compliance model memory unit 205.

The position data memory unit 200 stores the target tip-end position data string to be used by the position command value generating unit 112 to generate the tip-end position command value. The link parameter memory unit 201 stores the link parameters related to the links of the robot. The friction parameter memory unit 202 stores the data about the friction parameters that have been determined beforehand from the speed-torque relationship in a constant-speed operation and are to be used by the first friction torque calculating unit 301 to calculate the first friction torque. The Jacobian matrix memory unit 203 stores the Jacobian matrix calculated by the Jacobian matrix calculating nit 105. The force/moment data memory unit 204 stores the target tip-end force data string to be used by the force command value generating unit 109 to generate the tip-end position force command value. The compliance model memory unit 205 stores a predetermined compliance model.

(Robot Control Method)

Figure 5:
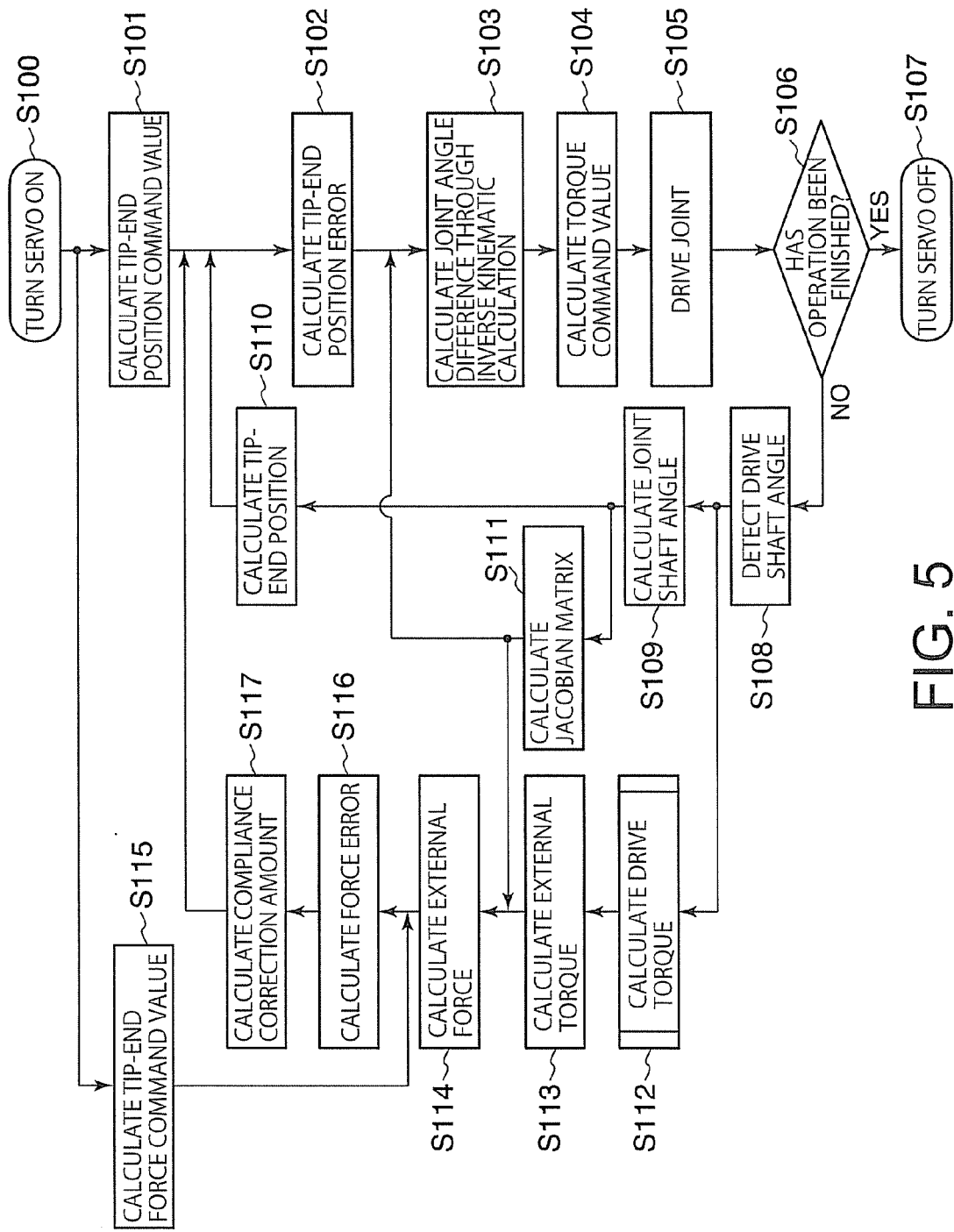
FIG. 5 is a flowchart showing an operation of the robot control apparatus according to the embodiment.

Referring now to the flowchart shown in FIG. 5, operations of the robot control apparatus according to this embodiment will be described.

a) First, a control operation is started. The position command value generating unit 112 reads a target tip-end position data string from the position data memory unit 200, and, based on the target tip-end position data string, the position command value generating unit 112 generates the tip-end position command value of each control cycle (steps S100 and S101).

In step S102, from the tip-end position command value generated by the position command value generating unit 112 and the tip-end position calculated by the tip-end position calculating unit 104, the position error calculating unit 113 calculates a position error by taking into account the later-described compliance correction amount. Subsequently, in step S103, a joint angle difference is calculated by performing an inverse kinematic calculation on the position error calculated by the position error calculating unit 113, as indicated by the equation (7) using a Jacobian matrix read from the Jacobian matrix memory unit 203.

After that, in step S104, the torque command value calculating unit 115 calculates a torque command value by integrating the joint angle difference calculated by the joint angle difference calculating unit 114.

In step S105, the drive unit 101 drives the actuator 100 to drive the joint shaft, using a control target value that is the torque command value calculated by the torque command value calculating unit 115. In this manner, the tip-end position is controlled.

In step S106, an end of the control operation is confirmed. In step S107, the servo process is finished. If an end of the control operation is not confirmed in step S106, the operation moves on to the later-described step S108.

b) In step S108, the drive shaft angle detecting unit 102 detects the drive shaft angle.

In step S109, from the drive shaft angle calculated by the drive shaft angle detecting unit 102, the joint shaft angle calculating unit 103 calculates the joint shaft angle, based on the speed reduction ratio of the speed reducer or the like.

In step S110, the tip-end position calculating unit 104 reads link parameters from the link parameter memory unit 201. Using the read link parameters and the joint shaft angle calculated by the joint shaft angle calculating unit 103, the tip-end position calculating unit 104 calculates the tip-end position through a forward kinematic calculation.

In step S111, using the joint shaft angle calculated by the joint shaft angle calculating unit 103, the Jacobian matrix calculating unit 105 calculates a Jacobian matrix.

c) In step S112, using the drive shaft angle calculated by the drive shaft angle detecting unit 102 and the joint shaft angle calculated by the joint shaft angle calculating unit 103, the drive torque estimating unit 106 estimates the drive torque.

In step S113, the external torque calculating unit 107 calculates the external torque, based on the difference between the drive torque estimated by the drive torque estimating unit 106 and the actual torque command value calculated by the torque command value calculating unit 115.

In step S114, using the external torque calculated by the external torque calculating unit 107 and the Jacobian matrix calculated by the Jacobian matrix calculating unit 105, the external force calculating unit 108 calculates the external force expressed by the equation (3).

d) In step S115, the force command value generating unit 109 reads an acceptable force/moment data string from the force/moment data memory unit 204, and calculates a force/moment command value from the read force/moment data.

In step S116, the force error calculating unit 110 calculates a force error, using the force/moment command value calculated by the force command value generating unit 109 and the external force calculated by the external force calculating unit 108.

e) In step S117, the compliance correction amount calculating unit 111 reads a compliance model from the compliance model memory unit 205, and, using the compliance model, calculates the compliance correction amount $\Delta x_{comp}$ expressed by the equation (5). Using the compliance correction amount $\Delta x_{comp}$, the compliance correction amount calculating unit 111 calculates a tip-end position correction amount corresponding to the force error calculated by the force error calculating unit 110.

The operation then returns to step S102. As opposed to the difference between the tip-end position command value generated by the position command value generating unit 112 and the tip-end position calculated by the tip-end position calculating unit 104, the position error calculating unit 113 calculates a position error by taking into account the correction amount calculated by the compliance correction amount calculating unit 111.

In the above described drive torque estimating operation, a drive torque is estimated with the use of the first and second friction torques, the inertia torque, and the gravity torque. However, the present invention is not limited to that. For example, parameters such as centrifugal force and Coriolis force may be further taken into account.

Figure 6:
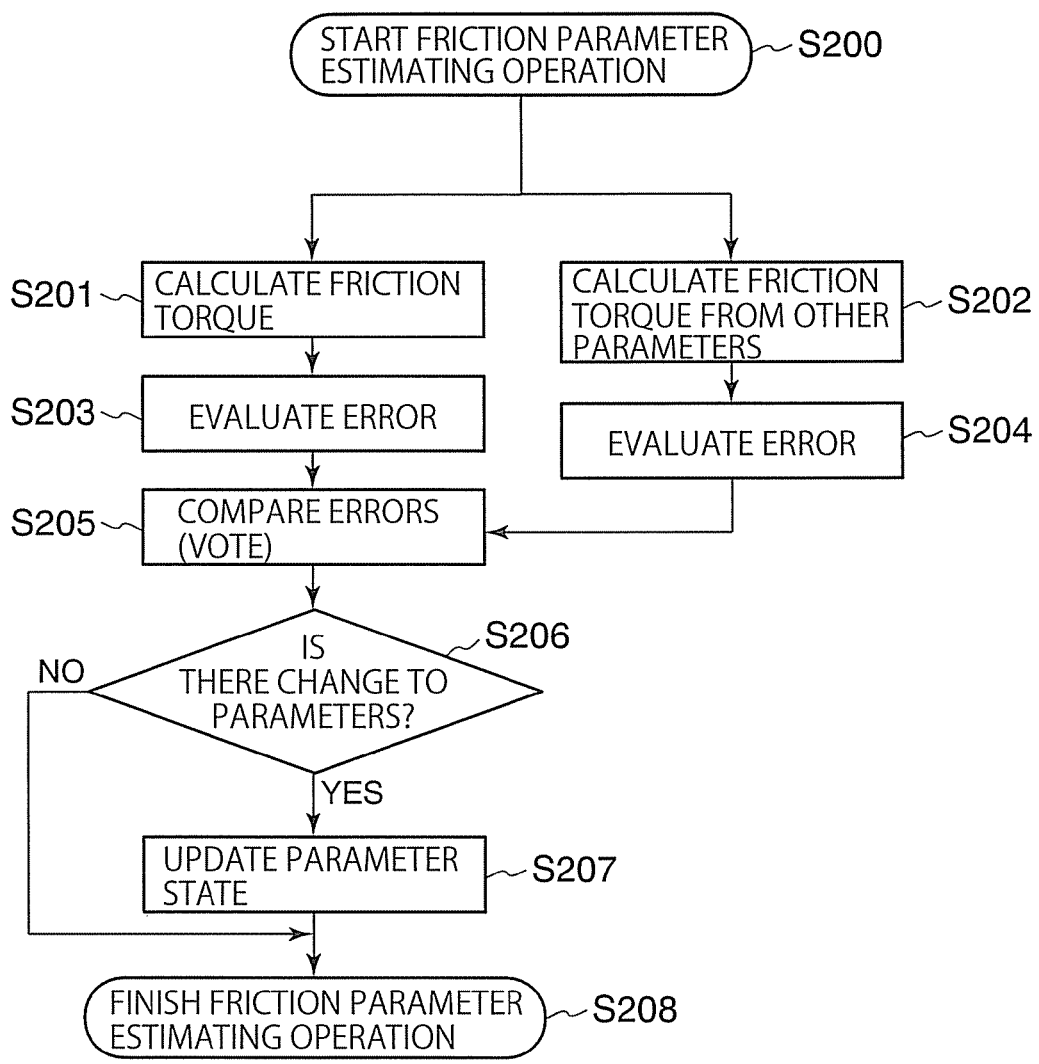
FIG. 6 is a flowchart showing a friction parameter updating operation.

Referring now to the flowchart shown in FIG. 6, a friction parameter updating operation according to the present embodiment will be described. It should be noted that this operation is to be performed in the same cycles as the cycles of control performed by the robot control apparatus or several times as often as the control performed by the robot control apparatus.

a) The timing of starting the friction parameter estimating operation (step S200) is the time when the drive torque is calculated in step S112. In step S201, the first friction torque calculating unit 301 calculates the first friction torque from the drive shaft angle calculated by the drive shaft angle detecting unit 102 and the friction parameters. In step S202, the second friction torque calculating unit 305 calculates the second friction torques from the drive shaft angle and minutely-changed parameters.

b) In step S203, the external torque calculating unit 107 calculates an external torque, and sets the external torque as an error. In step S204, the friction torque evaluating unit 307 calculates an error from the torque command value and the drive torque.

c) In step S205, the errors in the first and second friction torques are compared with one another, and votes are cast for the set of friction parameters having the smallest absolute values of errors.

d) In step S206, a check is made to determine whether the current cycle is a cycle for updating the friction parameters. If the current cycle is an updating cycle, the operation moves on to step S207. In step S207, the friction parameters having gained the largest number of votes as a result of the voting are stored into the friction parameter memory unit 202. In this manner, the friction parameters are updated. If the current cycle is not an updating cycle, the operation moves on to step S208, and comes to an end.

As described so far, according to the present embodiment, friction torques can be estimated with high accuracy, and an external force acting on the robot can be estimated with higher accuracy even where a force sensor is not used. Accordingly, stable force control can be performed.

(First Modification)

As a first modification of the present embodiment, a method of evaluating errors in friction torques will be described. In the above described embodiment, votes are cast for the friction parameters having the smallest absolute values of errors. However, in a case where there is a threshold value and the smallest absolute value of errors does not exceed the threshold value, a vote is cast for the current friction parameters. If the smallest absolute value is equal to or higher than the threshold value, a vote is cast for the friction parameters having the smallest absolute values of errors. With this arrangement, the friction parameters are updated less often. Accordingly, a rapid change does not occur, and stable operations can be performed.

In a case where there exist two or more sets of friction parameters that have gained almost the same number of votes, the current friction parameters are not changed to the set of friction parameters that has gained the largest number of votes, but the minute changes may be linearly interpolated in accordance with the numbers of votes obtained, instead. For example, in a case where the set of $(A+\Delta A, B-\Delta B, C)$ has gained $N_1$ votes, and
the set of $(A+\Delta A, B, C+\Delta C)$ has gained $N_2$ votes,
the calculation is performed as: $(A+\Delta A, B-\Delta B \times N_1/(N_1+N_2), C+\Delta C \times N_2/(N_1+N_2))$. If such a linearly-interpolating operation is performed in all the cases, the amount of calculations becomes larger. Therefore, this linear interpolation is performed only when two or more sets of friction parameters have almost the same number of votes.

One of the possible causes of the same number of votes gained by two or more sets of friction parameters is that minute change parameters are slightly too large. Therefore, when linearly-interpolating operations are successively performed, the minute change parameters stored in the minute change parameter memory unit 306 are changed.

Errors obtained by subtracting an inertial torque, a gravity torque, and friction torques calculated based on friction parameters from torque command values include not only errors resulting from estimate errors in friction parameters, but also errors resulting from estimate errors in other parameters such as the external torque based on the external force acting on the robot, or modeling errors resulting from mechanical factors that are not taken into account in the above described embodiment. To eliminate such external factors and draw attention only to the estimate errors in friction parameters, the robot may be actually operated to carry out a friction parameter estimating test to estimate friction parameters. In such a case, no external forces act on the robot, and modeling errors become uniform in predetermined operations. Accordingly, errors mostly depend on the errors in the parameter estimation.

Meanwhile, errors can also be evaluated in regular operations. However, the possibility that the external factors act on the robot cannot be completely eliminated. Therefore, measures should be taken by lowering the criteria for evaluating errors, so that more stable estimating operations can be performed. For example, if the threshold value set for the absolute values of errors as described in the first modification is made higher, the parameters are updated less often and are stabilized. If each updating interval is made longer, the parameters are updated after a larger amount of data is collected, and accordingly, higher reliability is achieved.

(Second Modification)

Figure 7:
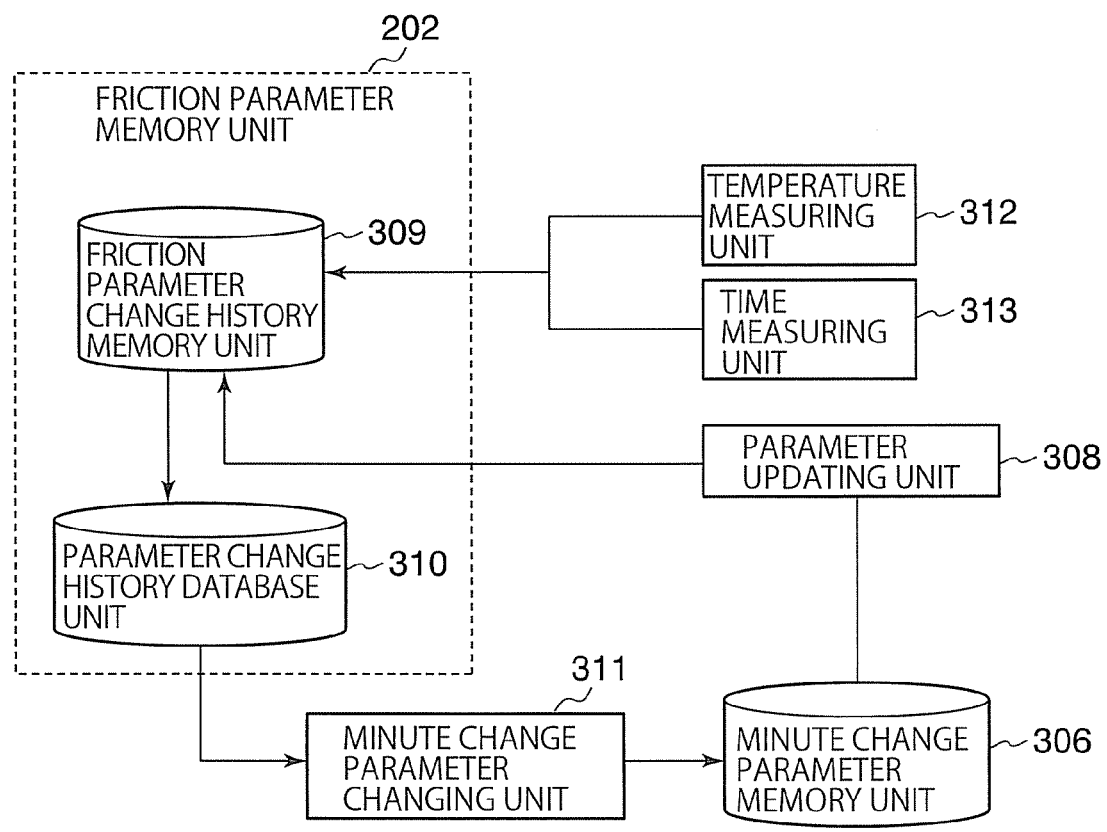
FIG. 7 is a control block diagram of a second modification of the embodiment.

As a second modification of the present embodiment, a parameter change utilizing a parameter change history will be described. As shown in FIG. 7, a friction parameter change history memory unit 309 and a parameter change history database unit 310 are formed in the friction parameter memory unit 202. Friction parameters updated by the parameter updating unit 308 are stored into the friction parameter change history memory unit 309, and are used as friction parameters when a friction torque is calculated. The friction parameter change history is transformed into a database, and is then stored into the parameter change history database unit 310. A change history of typical friction parameters measured by a robot of the same model as the robot being controlled is stored in the parameter change history database unit 310, and a minute change parameter changing unit 311 compares the change histories with each other. Based on the results of the comparison, the minute change in the friction parameters is corrected, and is then stored into the minute change parameter memory unit 306.

A temperature measured by a temperature measuring unit 312 during an operation or an operation time measured by a time measuring unit 313 may also be added to each change history. Normally, a friction tends to be smaller at a high temperature or when the operating time has elapsed. With the use of recorded temperatures and times, a malfunction such as a failure can be diagnosed when a change history of parameters does not conform to the general tendency.

OTHER EMBODIMENTS

Although an embodiment has been described above, the description and drawings illustrating part of the disclosure do not limit a scope of the present invention. From the disclosure, it will become apparent to those skilled in the art that various other embodiments, examples, and operations are possible.

For example, in the above described embodiment, the joint angular acceleration calculated by a two-time difference in joint shaft angle with respect to time is used when an inertia torque is calculated. However, the time lag becomes longer depending on the control cycle, and the torque error tends to be too large. In that case, the link acceleration is detected by an acceleration sensor mounted on the link, and the detected acceleration is converted into a joint shaft acceleration. Based on the joint shaft acceleration, an inertia torque may be calculated. As a model of a friction the linear sum of exponent functions may be used. The present invention may also be applied to models characterized by several parameters.

The CPU 1, the position data memory unit 200, the link parameter memory unit 201, the friction parameter memory unit 202, the Jacobian matrix memory unit 203, the force/moment data memory unit 204, the compliance model memory unit 205, and the like may be integrally embedded in the robot to be controlled. Alternatively, the CPU 1, the position data memory unit 200, the link parameter memory unit 201, the friction parameter memory unit 202, the Jacobian matrix memory unit 203, the force/moment data memory unit 204, the compliance model memory unit 205, and the like may be placed outside the robot to be controlled, and the robot may be remotely controlled in a wired or wireless manner.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A robot control apparatus that controls a robot comprising a joint shaft and a drive shaft transmitting a drive force to the joint shaft, comprising:
an actuator configured to drive the joint shaft in each control cycle;

a drive shaft angle detecting unit configured to detect an angle of the drive shaft;

a joint shaft angle calculating unit configured to calculate an angle of the joint shaft from the angle of the drive shaft;

a tip-end position calculating unit configured to calculate a position of a tip end of the robot from the angle of the joint shaft;

a position error calculating unit configured to calculate a position error between the tip-end position and a position command value of the tip-end position;

a Jacobian matrix calculating unit configured to calculate a Jacobian matrix between a task coordinate system and a joint coordinate system at the tip-end position, based on the angle of the joint shaft;

a joint angle difference calculating unit configured to calculate a joint angle difference;

a torque command value calculating unit configured to calculate a torque command value of a joint, based on the joint angle difference;

a drive unit configured to drive the actuator, based on the torque command value;

a drive torque estimating unit configured to estimate a drive torque for driving the actuator from the angle of the joint shaft;

an external torque calculating unit configured to calculate an external torque that is a difference between the drive torque estimated and the torque command value;

an external force calculating unit configured to calculate an external force acting on the tip-end position, from the external torque and the Jacobian matrix;

a compliance model memory unit configured to store a compliance model at the tip-end position;

a compliance correction amount calculating unit configured to calculate a compliance correction amount for a task coordinate system position at the tip-end position in accordance with the external force, using the compliance model, the compliance correction amount calculating unit correcting the position error with the use of the compliance correction amount;

a friction parameter memory unit configured to store friction parameters including at least one parameter of a model approximating a friction torque; and a friction torque evaluating unit, the drive torque estimating unit including: a drive shaft speed calculating unit configured to calculate a speed of the drive shaft from the angle of the drive shaft; an inertia torque calculating unit configured to calculate an inertia torque acting on the joint shaft; a gravity torque calculating unit configured to calculate a gravity force acting on the joint shaft; a first friction torque calculating unit configured to estimate a first friction torque, using the calculated speed of the drive shaft and the friction parameters stored in the friction parameter memory unit; and a second friction torque calculating unit configured to calculate a plurality of second friction torques by varying the friction parameters, the friction torque evaluating unit calculating a sum of a calculated first friction torque, a second friction torque selected from the plurality of second friction torques, the calculated inertia torque, and the calculated gravity torque, the friction torque evaluating unit calculating a torque error between the sum and the torque command value calculated by the torque command value calculating unit, the torque error being calculated for each of the second friction torques, the friction torque evaluating unit selecting a friction parameter based on the torque error, and the friction parameters being updated based on a result of the selection.

2. The apparatus according to claim 1, wherein the friction torque evaluating unit selects a friction parameter having a smallest absolute value of the torque error.

3. The apparatus according to claim 1, wherein the friction torque evaluating unit selects a current friction parameter when the smallest absolute value of the torque error does not exceed a predetermined threshold value, and the friction torque evaluating unit selects a friction parameter having the smallest absolute value of the torque error when the smallest absolute value of the torque error is equal to or larger than the threshold value.

4. The apparatus according to claim 1, further comprising a parameter updating unit for updating the friction parameters, the parameter updating unit counting the friction parameters selected by the friction torque evaluating unit in a friction parameter estimating interval and storing a friction parameter selected most often in a predetermined updating interval into the friction parameter memory unit.

5. The apparatus according to claim 1, wherein
the friction parameter memory unit includes:
a parameter change history memory unit configured to store the friction parameters changed and store a change history of the friction parameters; and
a parameter change history database unit configured to store a first change history that is the change history of the friction parameters turned into a database, and a second change history that is a change history of friction parameters that are measured by a robot of the same model as the robot and are turned into a database, and
the robot control apparatus further comprises:
a minute change parameter changing unit configured to compare the first change history with the second change history and, based on a result of the comparison, changing a minute change in the friction parameters.

6. The apparatus according to claim 5, further comprising:
a temperature measuring unit configured to measure a temperature during an operation of the robot; and
a time measuring unit configured to measure an overall operating time of the robot,
the temperature data and the overall operating time being added to the first and second change histories.

* * * * *